(12) United States Patent
Ikeda et al.

(10) Patent No.: US 10,970,592 B2
(45) Date of Patent: Apr. 6, 2021

(54) ADHERING SUBSTANCE DETECTION APPARATUS AND ADHERING SUBSTANCE DETECTION METHOD

(71) Applicant: DENSO TEN Limited, Kobe (JP)

(72) Inventors: Nobuhisa Ikeda, Kobe (JP); Nobunori Asayama, Kobe (JP); Takashi Kono, Kobe (JP); Yasushi Tani, Kobe (JP); Daisuke Yamamoto, Kobe (JP); Tomokazu Oki, Kobe (JP); Teruhiko Kamibayashi, Kobe (JP)

(73) Assignee: DENSO TEN Limited, Hyogo-ku (JP)

( * ) Notice: Subject to any disclaimer, the term of this patent is extended or adjusted under 35 U.S.C. 154(b) by 83 days.

(21) Appl. No.: 16/562,815

(22) Filed: Sep. 6, 2019

(65) Prior Publication Data
US 2020/0210750 A1 Jul. 2, 2020

(30) Foreign Application Priority Data
Dec. 28, 2018 (JP) .............................. JP2018-246916

(51) Int. Cl.
*G06K 9/46* (2006.01)
*G06K 9/00* (2006.01)
*G06K 9/32* (2006.01)

(52) U.S. Cl.
CPC ....... *G06K 9/4661* (2013.01); *G06K 9/00791* (2013.01); *G06K 9/3233* (2013.01); *G06K 9/4647* (2013.01)

(58) Field of Classification Search
CPC ............ G06K 9/4661; G06K 9/00791; G06K 9/4647; G06K 9/3233

USPC ......................................................... 382/103
See application file for complete search history.

(56) References Cited

U.S. PATENT DOCUMENTS

| | | | |
|---|---|---|---|
| 8,345,921 B1 * | 1/2013 | Frome ................ | G06K 9/00771 382/103 |
| 10,096,124 B2 * | 10/2018 | Hayakawa ............ | G08G 1/166 |
| 10,380,853 B1 * | 8/2019 | Solh .................... | G06K 9/00362 |
| 10,423,860 B1 * | 9/2019 | Kim ..................... | G06N 3/0454 |

(Continued)

FOREIGN PATENT DOCUMENTS

| | | |
|---|---|---|
| JP | 2014-030188 A | 2/2014 |
| JP | 2015-061163 A | 3/2015 |
| JP | 2018-191087 A | 11/2018 |

*Primary Examiner* — Ali Bayat
(74) *Attorney, Agent, or Firm* — Oliff PLC

(57) ABSTRACT

An adhering substance detection apparatus includes calculating, first and second detecting, and generating units. The calculating unit calculates a variation in a feature value related to luminance in past and current captured images captured by an image capturing device, based on the luminance of pixels included in the captured images. The first detecting unit detects a first region in which the variation calculated by the calculating unit falls within a threshold range, and the feature value in the current captured image falls within a threshold range. The second detecting unit detects a second region in which an irregularity in a distribution of the luminance of the pixels included in the captured image satisfies a predetermined irregularity condition. The generating unit generates a sum region being a sum of the first and second regions, as an adhering substance region corresponding to an adhering substance adhering to the image capturing device.

7 Claims, 13 Drawing Sheets

(56) References Cited

U.S. PATENT DOCUMENTS

| | | | |
|---|---|---|---|
| 2015/0220794 A1* | 8/2015 | Baba | G06T 7/254 |
| | | | 382/103 |
| 2015/0323785 A1* | 11/2015 | Fukata | H04N 5/2171 |
| | | | 348/148 |
| 2016/0110606 A1* | 4/2016 | Lee | G06K 9/00798 |
| | | | 382/104 |
| 2017/0109592 A1* | 4/2017 | Hwang | G06K 9/00885 |
| 2019/0050980 A1* | 2/2019 | Liu | G06K 9/00134 |

* cited by examiner

ADHERING SUBSTANCE DETECTION APPARATUS AND ADHERING SUBSTANCE DETECTION METHOD

CROSS-REFERENCE TO RELATED APPLICATION

This application is based upon and claims benefit of priority of the prior Japanese Patent Application No. 2018-246916, filed on Dec. 28, 2018, the entire contents of which are incorporated herein by reference.

FIELD

The embodiment discussed herein is directed to an adhering substance detection apparatus and an adhering substance detection method.

BACKGROUND

Conventionally having been known is an adhering substance detection apparatus that detects an adhering substance adhering to a lens, based on a temporal change in the luminance values of segments that are divisions of the area of the captured image (see Japanese Laid-open Patent Publication No. 2014-30188, for example).

However, in the conventional technology, there has been some room for improvement in highly accurate detection of an adhering substance. For example, when the adhering substance is a mixture of a water drop and mud, the region corresponding to the water drop has higher luminance than the region corresponding to the mud. Therefore, in of attempt to detect one of such regions, the detection of the other may fail.

SUMMARY

An adhering substance detection apparatus according to an embodiment includes a calculating unit, a first detecting unit, a second detecting unit, and a generating unit. The calculating unit calculates a variation in a feature value related to luminance in past and current captured images captured by an image capturing device, based on the luminance of pixels included in the captured images. The first detecting unit detects a first region in which the variation calculated by the calculating unit falls within a predetermined threshold range, and the feature value in the current captured image fails within a predetermined threshold range. The second detecting unit detects a second region in which an irregularity in a distribution of the luminance of the pixels included in the captured image satisfies a predetermined irregularity condition. The generating unit generates a sum region that is a sum of the first region detected by the first detecting unit and a second region detected by the second detecting unit, as an adhering substance region corresponding to an adhering substance adhering to the image capturing device.

DESCRIPTION OF EMBODIMENT

An adhering substance detection apparatus and an adhering substance detection method according to an embodiment of the present invention will now be explained in detail with reference to the appended drawings. However, the embodiment described below is not intended to limit the scope of the present invention in any way.

Figure 1:
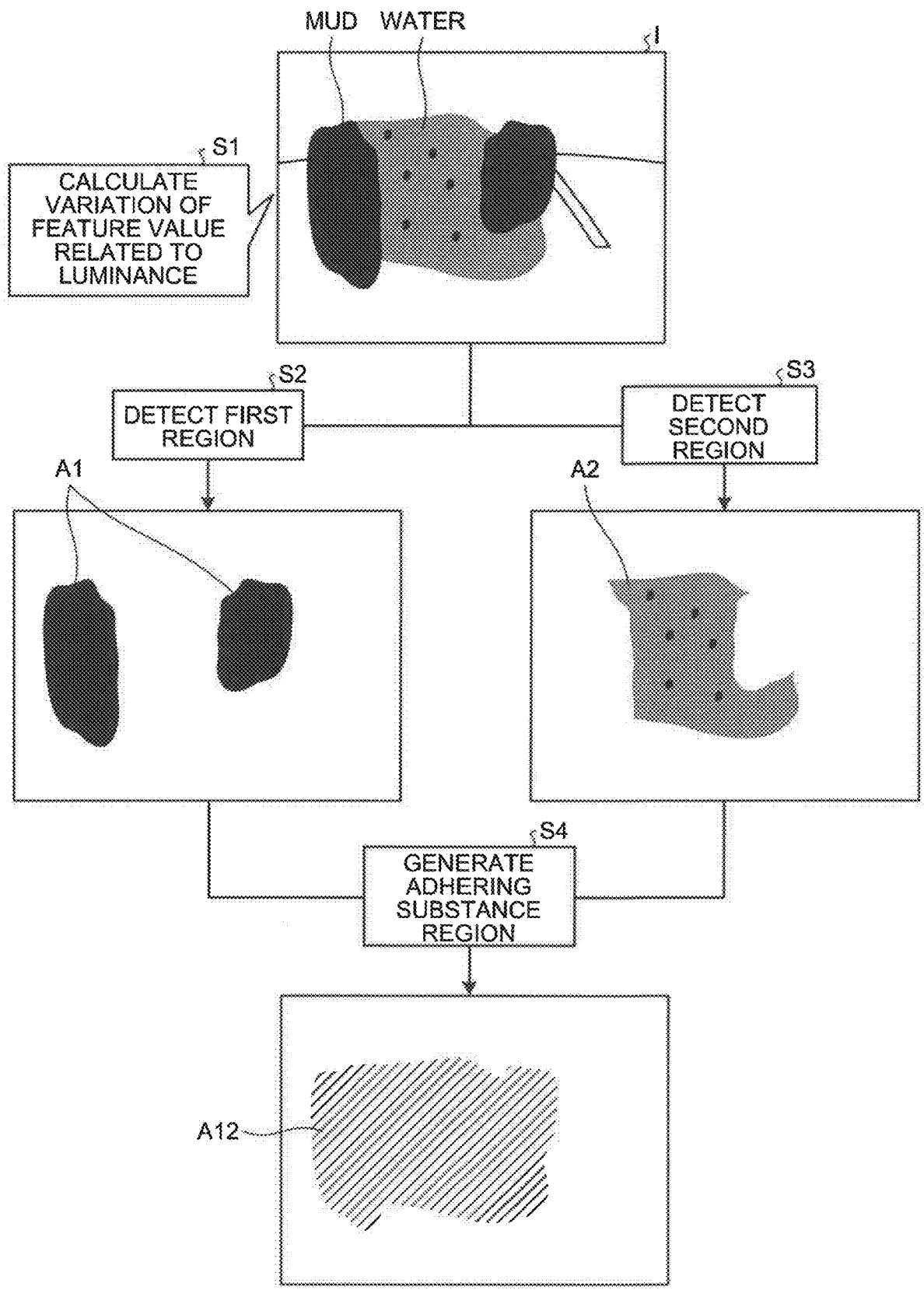
FIG. 1 is a schematic giving a general outline of an adhering substance detection method according to an embodiment.

To begin with, a general outline of an adhering substance detection method according to an embodiment will be explained with reference to FIG. 1. FIG. 1 is a schematic giving a general outline of the adhering substance detection method according to the embodiment. FIG. 1 illustrates a captured image I that is captured by a camera that is onboard a vehicle, with some adhering substance that is a mixture of water and mud adhering to the lens of the camera, for example. In the captured image I illustrated in FIG. 1, while a region containing a larger amount of mud (mud illustrated in FIG. 1) is represented as a black region with no gradation, because such a region penetrates almost no light, a region containing a larger amount of water (water illustrated in FIG. 1) is represented as a blurred region, because such a region penetrates a slight amount of light. In other words, the region containing a larger amount of water has higher luminance, compared with the region containing a larger amount of mud. Examples of the adhering substance are not limited to water and mud, and may include any adhering substance represented as a black region with no gradation, and a blurred region in the captured image I.

Conventionally, when the adhering substance is substance such as a mixture of mud and water, if the luminance threshold is set to a level for detecting the mud, the region blurred with water may not be detected, because the threshold is set to a low level. If the luminance threshold is set to a level for detecting both of the water and the mud, a larger number of objects other than the adhering substance may be detected erroneously, because the threshold is set to a high level. Examples of the blurred region include a region including blurred objects in the background, a region having become blurred due to the different concentrations of the mud contained in the water, and a region having become blurred due to the three-dimensional shape of a water drop, for example.

To address this issue, the adhering substance detection apparatus 1 according to the embodiment (see FIG. 2) detects adhering substance such as a mixture of water and mud highly accurately, by performing an adhering substance detection method. Specifically, the adhering substance detection method according to the embodiment performs a first detection process for detecting a black region with no gradation, which corresponds to mud, for example, and a second detection process for detecting a blurred region, which corresponds to water, for example. The sum of the two types of regions detected by these two detection processes is then established as an adhering substance region. The adhering substance detection method according to the embodiment will now be explained with reference to FIG. 1.

As illustrated in FIG. 1, to begin with, the adhering substance detection method according to the embodiment calculates a variation in a feature value related to the luminance in past and current captured images I captured by the camera, based on the luminance of the pixels included in the captured images I (S1). The feature value includes a representative value of the luminance and a dispersion of the luminance of a predetermined region. Specifically, a mean value is used as the representative value, and a standard deviation is used as the dispersion. The variation is the difference between a feature value calculated from the past captured image I and a feature value calculated from the current captured image I, for example.

The adhering substance detection method according to the embodiment then detects a first region A1 in which the calculated variation in the feature value falls within a predetermined threshold range, and in which the feature value in the current captured image I falls within a predetermined threshold range (S2). In other words, by performing the first detection process, the adhering substance detection method according to the embodiment detects a first region A1 that is a black region with no gradation, in which the feature value has gone through little variation from the past to the present, and in which the current feature values are small. The details of the method for detecting the first region A1 will be described later.

The adhering substance detection method according to the embodiment then detects a second region A2 in which an irregularity in the distribution of the luminance of the pixels included in the current captured image I satisfies a predetermined irregularity condition (S3). Specifically, by performing the second detection process, the adhering substance detection method according to the embodiment detects a region in which the irregularity in the luminance distribution is moderate, that is, a blurred region, as a second region A2. More specifically, the second region A2 can be also said to be a region in which the variation in the feature value falls within the predetermined threshold range and the feature value in the current captured image is outside the predetermined threshold range. Details of the method for detecting the second region A2 will be described later. The distribution of the luminance of the pixels herein means a shape in which the luminance changes along a predetermined direction of a subject image. For example, defining a predetermined coordinate (x0, y0) of the image as a point of origin, and denoting the luminance of the pixels in a horizontal direction x as L(x), the shape drawn as a graph of x-L(x) is referred to as a pixel luminance distribution in the horizontal direction, with the point of origin at (x0, y0). x0, y0 may be set to any coordinates, and the direction may be set to any direction at any angle, including a vertical direction.

The adhering substance detection method according to the embodiment then generates a sum region that is the sum of the detected first region A1 and the second region A2, as an adhering substance region A12 corresponding to the adhering substance (S4).

In other words, the adhering substance detection method according to the embodiment separately detects the first region A1 that is a black region with no gradation, which corresponds to the mud, and detects the second region A2 that is a blurred region, which corresponds to the water, and detects the adhering substance region A12 by taking the sum of the first region A1 and the second region A2 at the final step.

In this manner, even if the adhering substance is a mixture of mud and water, for example, it is possible to detect the mud and the water, by performing separate detection processes suitable for the characteristics of the two. In other words, with the adhering substance detection method according to the embodiment, adhering substance can be detected highly accurately.

The adhering substance detection method according to the embodiment sets a plurality of segments to the captured image I, and generates the adhering substance region A12 correspondingly to the segments, but this point will be described later.

Furthermore, the adhering substance detection method according to the embodiment then determines whether the adhering substance has been removed based only on the variation in the feature value related to the luminance in the adhering substance region A12, unlike the determination as to whether the adhering substance region A12 adheres to. This point will be described later.

Figure 2:
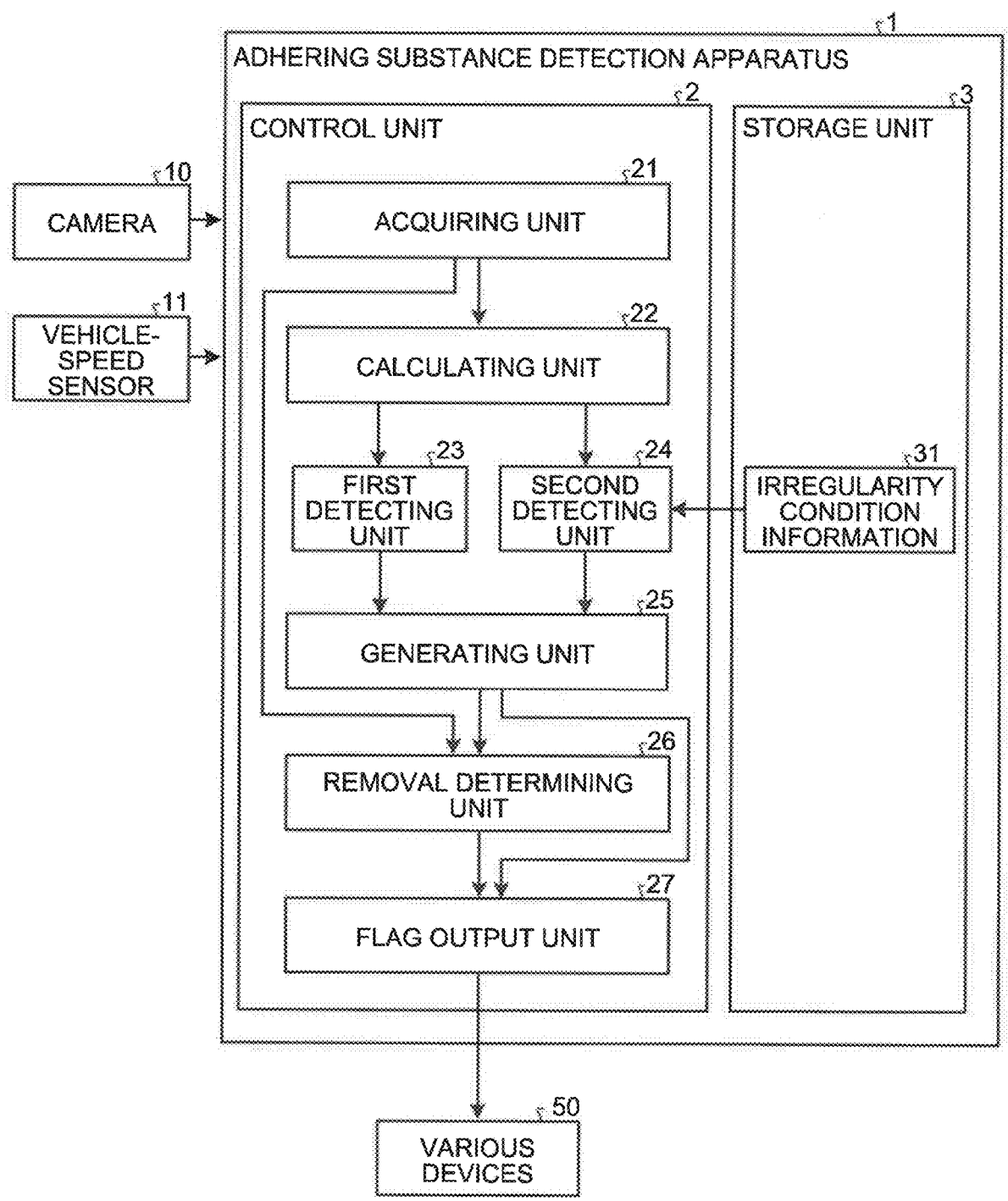
FIG. 2 is a block diagram illustrating a configuration an adhering substance detection apparatus according to the embodiment.

A configuration of the adhering substance detection apparatus 1 according to the embodiment will now be explained with reference to FIG. 2. FIG. 2 is a block diagram illustrating a configuration of the adhering substance detection apparatus 1 according to the embodiment. As illustrated in FIG. 2, the adhering substance detection apparatus 1 according to the embodiment is connected to a camera 10, a vehicle-speed sensor 11, and various devices 50. In the example illustrated in FIG. 2, the adhering substance detection apparatus 1 is provided separately from the camera 10 and the various devices 50, but the configuration is not limited thereto, and the adhering substance detection apparatus 1 may be integrated with at least one of the camera 10 and the various devices 50.

The camera 10 is a camera that is onboard a vehicle, and is provided with a lens such as a fisheye lens, and an imaging device such as a charge-coupled device (COD) or a complementary metal oxide-semiconductor (CMOS). The camera 10 is provided at each position where images of the front and the rear sides, and the lateral sides of the vehicle can be captured, for example, and the captured images I are output to the adhering substance detection apparatus 1.

The various devices 50 are devices that perform various vehicle control by acquiring detection results of the adhering substance detection apparatus 1. The various devices 50 include a display device for notifying a user of the presence of an adhering substance adhering to the lens of the camera 10 or of an instruction for wiping the adhering substance, a removing device for removing the adhering substance by spraying fluid, gas, or the like toward the lens, and a vehicle control device for controlling automated driving and the like, for example.

As illustrated in FIG. 2, the adhering substance detection apparatus 1 according to the embodiment includes a control unit 2 and a storage unit 3. The control unit 2 includes an acquiring unit 21, a calculating unit 22, a first detecting unit 23, a second detecting unit 24, a generating unit 25, a removal determining unit 26, and a flag output unit 27. The storage unit 3 stores therein irregularity condition information 31.

The adhering substance detection apparatus 1 includes a computer or various types of circuits including a central processing unit (CPU), a read-only memory (ROM), a random-access memory (RAM), a data flash memory, and an input/output port.

The CPU included in the computer functions as the acquiring unit 21, the calculating unit 22, the first detecting unit 23, the second detecting unit 24, the generating unit 25, the removal determining unit 26, and the flag output unit 27 included in the control unit 2, by reading and executing a computer program stored in the ROM, for example.

At least one of or the whole of the acquiring unit 21, the calculating unit 22, the first detecting unit 23, the second detecting unit 24, the generating unit 25, the removal determining unit 26, and the flag output unit 27 included in the control unit 2 may be implemented as hardware such as an application specific integrated circuit (ASIC) or a field-programmable gate array (FPGA).

The storage unit 3 corresponds to, for example, a RAM or a data flash memory. The RAM or the data flash memory is capable of storing therein the irregularity condition information 31, information of various computer programs, and the like. The adhering substance detection apparatus 1 may also acquire these computer programs or various types of information from another computer connected over a wired or wireless network, or via a portable recording medium.

The irregularity condition information 31 stored in the storage unit 3 is information including conditions that are used as a reference in a detection process performed by the second detecting unit 24, which will be described later, and includes a pattern condition for the irregularity in a luminance distribution, for example. A pattern condition is a pattern of the shape of the irregularity that is a map of the luminance distribution, or a pattern of a luminance data sequences in the luminance distribution. The detection process using the irregularity condition information 31 will be described later.

The acquiring unit 21 acquires various types of information. The acquiring unit 21 acquires an image captured by the camera 10, and generates (acquires) a current frame that is the current captured image I. Specifically, the acquiring unit 21 performs a gray-scaling process for converting each pixel. of the acquired image into a gray scale value between white and black, based on the luminance of the pixel.

The acquiring unit 21 also performs a pixel decimation process to the acquired image, and generates an image having a smaller size than the acquired image. The acquiring unit 21 then generates a current frame that is an integral image of the sum and the sum of squares of the pixel values of the pixels, based on the image applied with the decimation process. A pixel value is information corresponding to luminance or an edge included in the pixel.

In this manner, by performing a decimation process to the acquired image, and generating an integral image, the adhering substance detection apparatus can increase the calculation speed of the subsequent processes. Therefore, it is possible to reduce the processing time for detecting adhering substance.

The acquiring unit 21 may also perform a smoothing process using a smoothing filter such as a mean filter. It is also possible for the acquiring unit 21 to generate a current frame having the same size as the acquired image, without applying the decimation process.

The acquiring unit 21 also acquires a vehicle speed, based on a signal from the vehicle-speed sensor 11.

Figure 3:
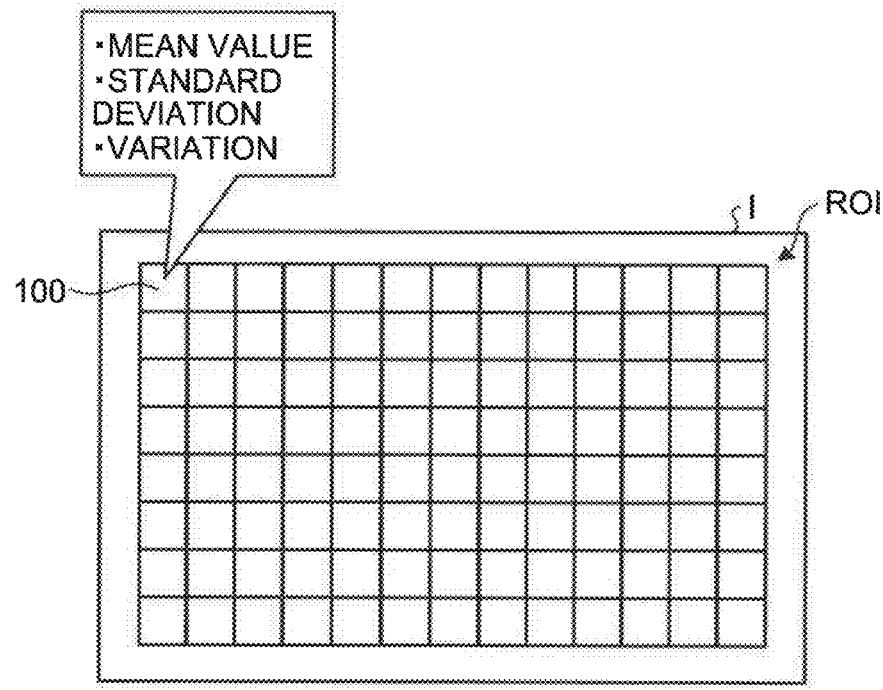
FIG. 3 is a schematic illustrating the details of a process performed by a calculating unit.

The calculating unit 22 calculates a variation in a feature value related to the luminance in the past and current captured images I acquired by the acquiring unit 21, based on the luminance of the pixels included in the captured images I. FIG. 3 a schematic illustrating the details of a process performed by the calculating unit 22.

As illustrated in FIG. 3, to begin with, the calculating unit 22 sets a region of interest ROI and segments 100 to the captured image I. The region of interest ROI is a rectangular region that is set in advance based on the characteristics of the camera 10, and is a region excluding the vehicle body region, for example. The segments 100 are rectangular regions resultant of dividing the region of interest ROI horizontally and vertically. For example, each of the segments 100 is a region including 40×40 pixels, but the number of pixels included in one segment 100 may be set to any number.

The calculating unit 22 calculates a feature value related to the luminance, for each of the segments 100. Specifically, the calculating unit 22 calculates a representative value of the luminance and a dispersion of the luminance as the feature value. The representative value is a value indicating representative luminance in the luminance distribution corresponding to a subject region, and, specifically, a mean value is used. Without limitation to the mean value, trimmed mean, median, or a mode, for example, may also be used. A dispersion is a value indicating the spread of the luminance distribution corresponding to a subject region, and, specifically, a standard deviation is used for that. Without limitation to a standard deviation, a variance, a maximum/minimum width, an interquartile width, or any percentile width may be used. Hereinafter, an example in which a mean value is used as the representative value, and a standard deviation is used as the dispersion will be explained. The calculating unit 22 also calculates these feature values related to the luminance, for the entire region of interest ROI.

The calculating unit 22 then calculates a variation in the feature value in the past and current captured images I. Specifically, the calculating unit 22 calculates a first difference that is a difference between a mean value of the luminance in a segment 100 in the current captured image I and a mean value of the luminance in the segment 100 that is at the same position in the past image, as a variation. In other words, the calculating unit 22 calculates the first difference between a current mean value and a past mean value of the luminance in the respective segments 100, as a variation.

The calculating unit 22 then calculates a second difference that is a difference between a standard deviation of the luminance in a segment 100 included in the current captured image I, and a standard deviation of the luminance in the segment 100 that is at the same position in the past image. In other words, the calculating unit 22 calculates the second difference between the standard deviation of the past luminance and that of the current luminance in the corresponding segment 100, as a variation. Hereinafter, the past captured image I will be sometimes referred to as a past frame I0, and the current captured image I will be sometimes referred to as a current frame I1.

Referring back to FIG. 2, the first ng unit 23 will now be explained. The first detecting unit 23 detects the first region A1 in which the variation in the feature value calculated by the calculating unit 22 falls within a predetermined threshold range, and in which the feature value in the current captured image I falls within a predetermined threshold range.

Specifically, the first detecting unit 23 determines whether each of the segments 100 is a first region A1 that satisfies a predetermined condition. In other words, the first detecting unit 23 detects the first region A1 correspondingly to the segment 100.

For example, the first detecting unit 23 determines that a segment 100 satisfies the predetermined condition if the conditions (1) to (3) described below are all satisfied, and detects the segment 100 as the first region A1. If at least one of the conditions (1) to (3) is not satisfied, the first detecting unit 23 determines that the segment 100 does not satisfy the predetermined condition, and detects the segment 100 as a region to which no adhering substance adheres.

(1) The first difference is equal to or less than a first predetermined difference;

(2) the second difference is equal to or less than a second predetermined difference; and (3) the mean value: of the luminance in the segment 100 is equal to or less than a first predetermined value.

The condition (1) is a condition for determining whether the degree of change in the luminance is small in the same segment 100. The first predetermined difference in the condition (1) sets an upper bound to the difference in the mean values of the luminance when the adhering substance adheres to, and is a difference that is set in advance based on experiments or the like. The first predetermined difference is "5", for example.

The condition (2) is a condition for suppressing the impact of the gain adjustment of the camera 10. The second predetermined difference in the condition (2) sets an upper bound to the difference in the luminance standard deviation when the adhering substance adheres to, and is a difference that is set in advance based on experiments or the like. The second predetermined difference is "1", for example.

The condition (3) is a condition for determining whether the luminance of the segment 100 in the current frame I1 is at a low level. The first predetermined value in the condition (3) is a value for allowing the presence of the adhering substance in the segment 100 to be determined, and is a value that is set based on the mean value of the luminance in the region of interest ROI included in the current frame I1, as illustrated in FIG. 4.

Figure 4:
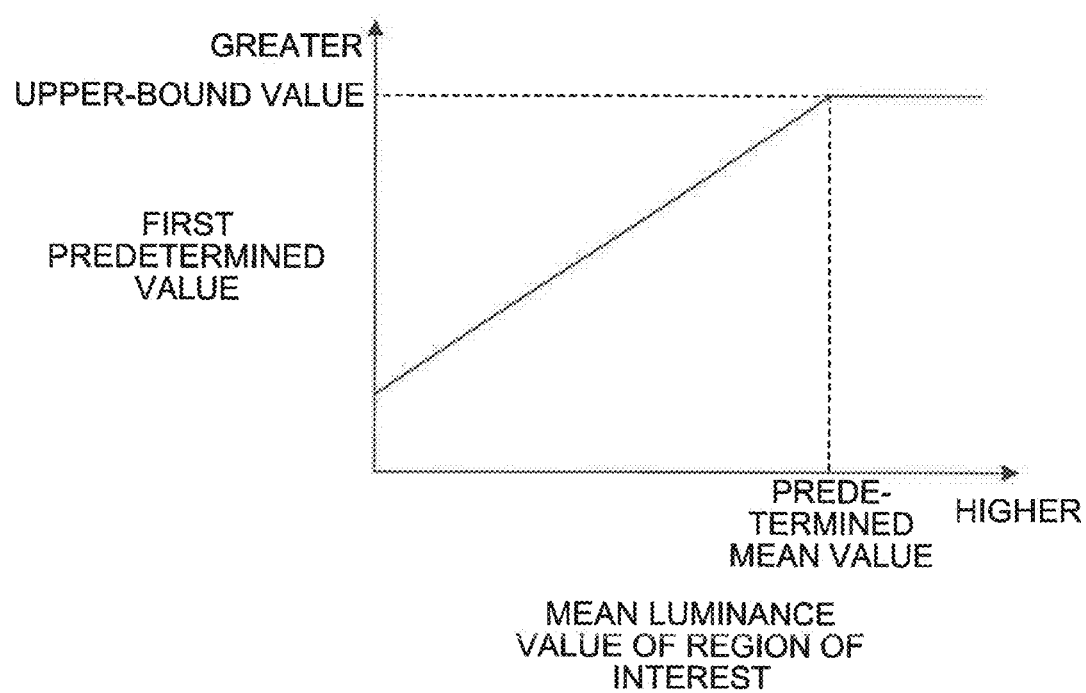
FIG. 4 is a schematic illustrating a relation between a mean value of the luminance in a region of interest, and a first predetermined value.

FIG. 4 is a schematic illustrating a relation between the mean value of the luminance in the region of interest ROI and the first predetermined value. When the mean value of the luminance in he region of interest ROI is higher, the first predetermined value is set higher. An upper bound is set to the first predetermined value, and the first predetermined value is set to the upper bound when the mean value of the luminance in the region of interest ROI is equal to or higher than a predetermined mean value that is set in advance. In this manner, even if the mean luminance value changes due to the gain adjustment carried out by the camera 10 based on the background of the captured image I, the first region A1 can be detected highly accurately.

By detecting a segment 100 that satisfies conditions (1) to (3) as a first region A1, the first detecting unit 23 can determine a segment 100 in which the adhering substance is present, correctly. Therefore, it is possible to improve the accuracy of the adhering substance region A12 that is generated at the final step.

The first detecting unit 23 may also calculate a counter value indicating the continuity of the satisfactions of the conditions (1) to (3), for each of the segments 100, and detect the segment 100 as the first region A1 when the counter value becomes equal to or greater than a predetermined threshold. Specifically, the first detecting unit 23 increments the current counter value if it is determined that the segment 100 in the current frame I1 satisfies the conditions (1) to (3), and decrements the current counter value if it is determined that the segment 100 in the current frame I1 does not satisfy the conditions (1) to (3). In other words, the first. detecting unit 23 updates the counter value in the segment 100.

The counter value has an upper-bound counter value and a lower-bound counter value that are set in advance. The value by which the counter value is incremented and decremented every time the determination is made may be the same or different.

Furthermore, the first detecting unit 23 may also perform the process of detecting the first region A1 only when the speed of the vehicle satisfies a predetermined condition. For example, the first detecting unit 23 may be caused to perform the detection process if the speed of the vehicle is equal to or lower than a predetermined vehicle speed. The predetermined vehicle speed is a vehicle speed that is set in advance, and is a vehicle speed at which the camera 10 is able to capture a captured image I from which the adhering substance is detectable, with a small amount of blur in the captured image I. For example, the predetermined vehicle speed is 80 km/h. In this manner, she first region A1 can be detected highly accurately.

Alternatively, the first detecting unit 23 may be configured to perform the detection process if the vehicle C is moving, specifically, if the vehicle speed is equal to or higher than a low vehicle speed that is set in advance. In this manner, it is possible to prevent the detection process to be performed repeatedly, when the vehicle C has stopped and the same captured image I has been captured repeatedly.

Furthermore, the first detecting unit 23 may be configured not to perform the process of detecting the first region A1 if the current frame I1 is a low-illuminance image, so that the generating unit 25 is not caused to generate the adhering substance region A12 at the subsequent stage. A low-illuminance image is a captured image I that is captured while the environment around the vehicle C is dark, e.g., while the vehicle C is driving during the nighttime or inside a tunnel.

The first detecting unit 23 determines that the current frame I1 is a low-illuminance image when the mean value of the luminance in the region of interest ROI included in the current frame I1 is equal to or lower than a predetermined low illuminance value, and the standard deviation of the luminance in the region of interest ROI included in the current frame I1 is equal to or less than a predetermined low illuminance deviation. The predetermined low illuminance value is a value that is set in advance, and is "85", for example. The predetermined low illuminance deviation is also a value that is set in advance, and is "50", for example.

In this manner, it is possible to suppress misdetection of an adhering substance adhering to the lens of the camera 10, when the image is captured in a low illuminance environment. Furthermore, by not causing the adhering substance detection apparatus 1 to perform the detection process when the current frame I1 is a low-illuminance image in which the adhering substance region A12 may not be detected correctly, the processing load can be suppressed.

Referring back to FIG. 2, the second detecting unit 24 will now be explained. The second detecting unit 24 detects a second region A2 in which the irregularity in the pixel luminance distribution in the captured image I satisfies a predetermined irregularity condition. Specifically, to begin with, the second detecting unit 24 extracts a candidate region 200 that is a candidate of the second region A2, from the captured image I acquired by the acquiring unit 21. Specifically, to begin with, the second detecting unit 24 extracts luminance information of the pixels, and edge information from the captured image I. The luminance of each pixel is expressed as a parameter ranging from 0 to 255, for example.

The second detecting unit 24 also detect an edge in the X-axis direction (the right-and-left direction of the captured image I) and an edge in the Y-axis direction (up-and-down direction of the captured image I) from each of the pixels, by performing an edge detection process based on the luminance of the pixels. In the edge detection process, any edge detection filter such as a Sobel filter or a Prewitt filter may be used.

The second detecting unit 24 then detects, as the edge information, a vector including an edge angle and edge strength information of the pixel, using a trigonometric function based on the edge in the X-axis direction and the edge in the Y-axis direction. Specifically, an edge angle is expressed as an orientation of the vector, and an edge strength is expressed as a length of the vector.

The second detecting unit 24 then performs a matching process (template matching) for matching the detected edge information with template information representing the contours of adhering substance, and prepared in advance, and extracts edge information that is similar to the template information. The second detecting unit 24 then extracts the region corresponding to the extracted edge information, that is, the candidate region 200 that is a rectangular region, including the contour of a blurred region that is a second region A2.

Because the candidate region 200 is a rectangular region surrounding the region including the matching edge information, unlike the segment 100 described above, the candidate region 200 have various sizes depending on the matching result. Furthermore, a plurality of candidate regions 200 may overlap each other.

Figure 5:
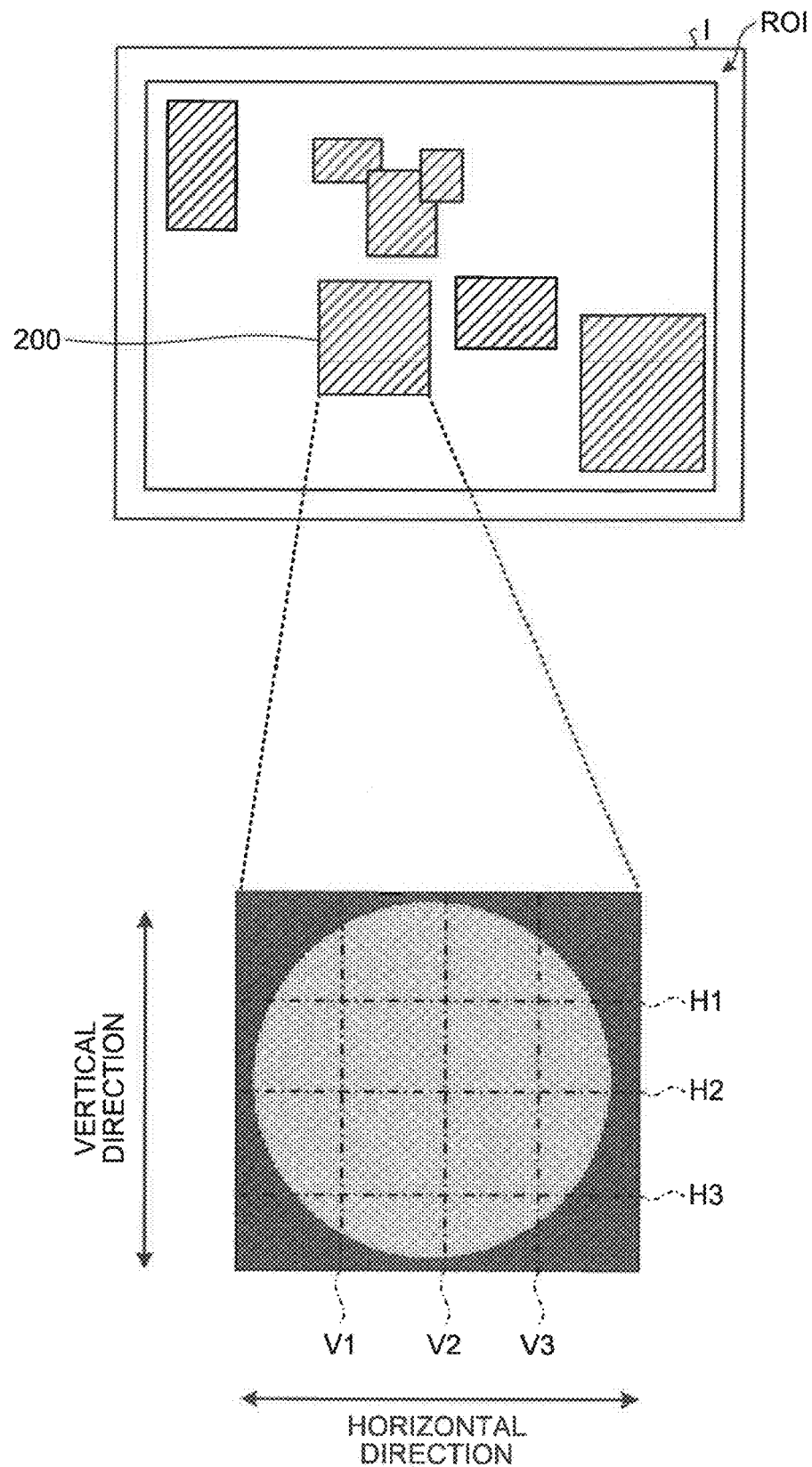
FIG. 5 is a schematic for explaining pixel arrays for which luminance distributions are extracted.

The second detecting unit 24 then extracts the luminance distribution corresponding to a predetermined pixel array that is included in the extracted candidate region 200. FIG. 5 is a schematic for explaining pixel arrays for which luminance distributions are extracted. As illustrated in FIG. 5, for each of the candidate regions 200 extracted from the captured image I, the second detecting unit 24 extracts the luminance distributions corresponding to three pixel arrays H1 to H3 in the horizontal direction, and of three pixel arrays V1 to V3 in the vertical direction.

The extracted pixel arrays may be the pixel arrays in at least one of the horizontal and the vertical directions. Furthermore, the number of pixel arrays to be extracted may be two or less, or four or more, without limitation to three.

The second detecting unit 24 then divides the extracted candidate region 200 into a predetermined number of unit regions, and calculates a representative value of the luminance, for each of the unit regions. The method by which the second detecting unit 24 calculates the representative value will be described later with reference to FIGS. 6 and 7.

The second detecting unit 24 converts the luminance of each pixel included in the candidate region 200 into a luminance unit representing a predetermined luminance range as a unit. For example, the second detecting unit 24 converts a parameter representing luminance within the range of 0 to 255 into a luminance unit that is a division of this parameter range at a predetermined interval.

Figure 6:
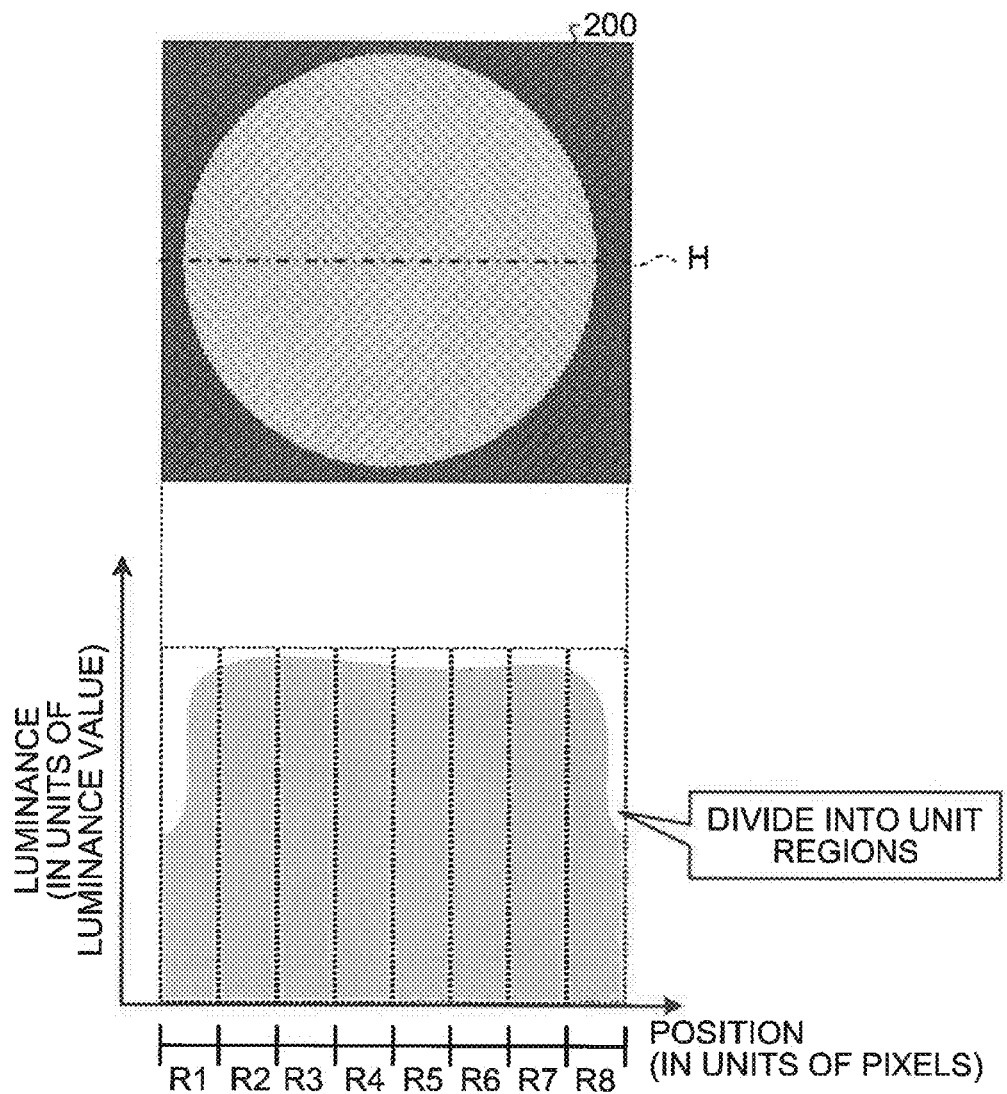
FIG. 6 is a schematic illustrating the details of a process performed by a second detecting unit.
Figure 7:
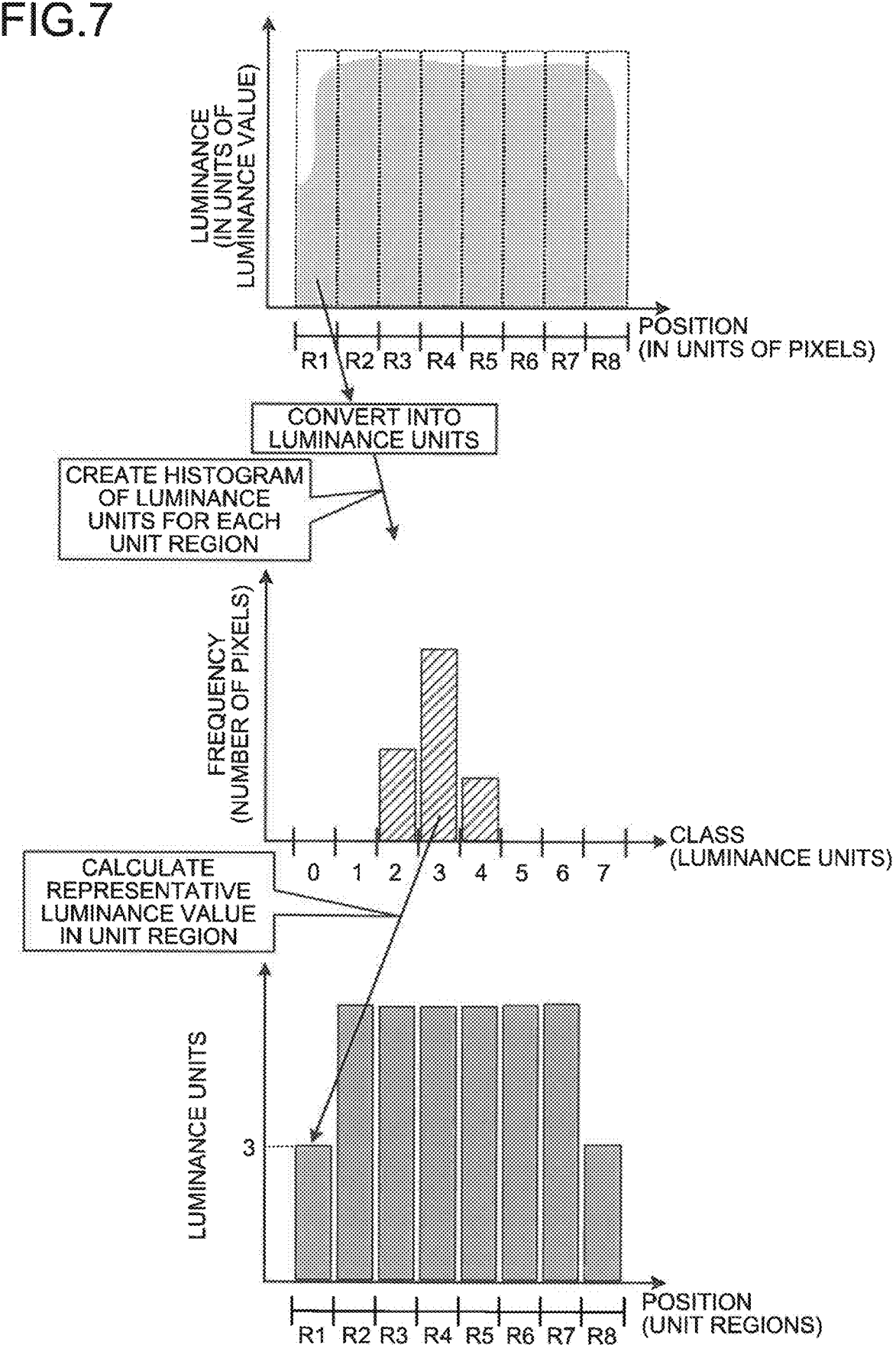
FIG. 7 is a schematic illustrating the details of the process performed by the second detecting unit.

FIGS. 6 and 7 are schematics illustrating the details of the process performed by the second detecting unit 24. To begin with, a method by which the second detecting unit 24 sets the unit regions will be explained with reference to FIG. 6. FIG. 6 illustrates the distribution of the luminance in one of the horizontal pixel arrays H.

As illustrated in FIG. 6, the second detecting unit 24 divides the horizontal pixel array into eight unit regions R1 to R8 (sometimes collectively referred to as unit regions R), for example. Each of the unit regions R1 to R8 may have the same width (the same number of pixels) (that is, the number of pixels that is an equal division of the pixel array), or have different widths from those the others.

The number of unit regions R into which the pixel array is divided is not limited to eight, and may be set to any number. It is preferable to keep the number of the unit regions R into which the pixel array is divided constant (eight, in FIG. 4), regardless of the size of the candidate regions 200 extracted from the captured image I. In this manner, although the extracted candidate regions 200 have various sizes, unified information can be obtained by keeping the number of unit regions R constant. Therefore, it is possible to suppress the processing load in the subsequent processes such as a determination process.

The second detecting unit 24 then calculates a representative value of the luminance in each of the unit regions R, as illustrated in FIG. 7. As illustrated in the top graph in FIG. 7, the second detecting unit 24 converts the luminance value of each pixel (e.g., ranging from 0 to 255) into a luminance unit, before calculating the representative value. Specifically, in FIG. 7, the range 0 to 255 is divided into eight luminance units. The luminance units are denoted as "0" to "7", respectively, the middle graph in FIG. 7. In this example, the width of the luminance values is divided at an interval of 32. For example, the luminance unit "0" corresponds to the luminance values 0 to 31, and the luminance unit "1" corresponds to the luminance values 32 to 63. In other words, this conversion into a luminance unit is a process of reducing the luminance resolution. In this manner, the resolution of the luminance distribution can be reduced to the number of desirable luminance units. Therefore, it is possible to reduce the processing load in the subsequent processes. In the conversion to a luminance unit, the number of luminance units into which the luminance range is divided, and the width of the luminance unit may be set any way. Furthermore, it is not necessary for the luminance units to have equal widths.

The second detecting unit 24 then creates a histogram of luminance units, for each of the unit regions R1 to R8. The middle graph in FIG. 7 illustrates the histogram for the unit region R1. In this histogram, the luminance units "0" to "7" are assigned as the classes, and the number of pixels are assigned as the frequency.

The second detecting unit 24 then calculates, for each of the unit regions R1 to R8, a representative luminance value based on the created histogram, as illustrated in the bottom graph in FIG. 7. For example, the second detecting unit 24 calculates the luminance unit corresponding to the class with the highest frequency in the histogram (class "3" in FIG. 7) as the representative luminance value in the unit region R1.

In this manner, because the number of data pieces in the luminance distribution can be reduced, from the number of pixels to the number unit regions R, the processing load in the subsequent processes can be reduced.

The second detecting unit 24 has been explained to calculate the luminance unit appearing at the highest frequency as the representative value, but without limitation thereto, the median, the mean value, and the like in the histogram may also be used as the representative value.

Furthermore, without limitation to the calculation of the representative value based on the histogram, the second detecting unit 24 may also calculate a mean value from the luminance values, for each of the unit regions R, and use the luminance unit corresponding to the mean value as the representative luminance value, for example.

Furthermore, the second detecting unit 24 has been explained to use a luminance unit as the representative value, but may also use the mean value or the like of the luminance values in the unit region R, as the representative value, as it is. In other words, the representative value may be expressed as a luminance unit or as a luminance value.

The second detecting unit 24 then determines whether the candidate region 200 is a second region A2 based on the irregularity in the pixel luminance distribution in the candidate region 200. The determination process performed by the second detecting unit 24 will now be explained with reference to FIGS. 8 and 9.

Figure 8:
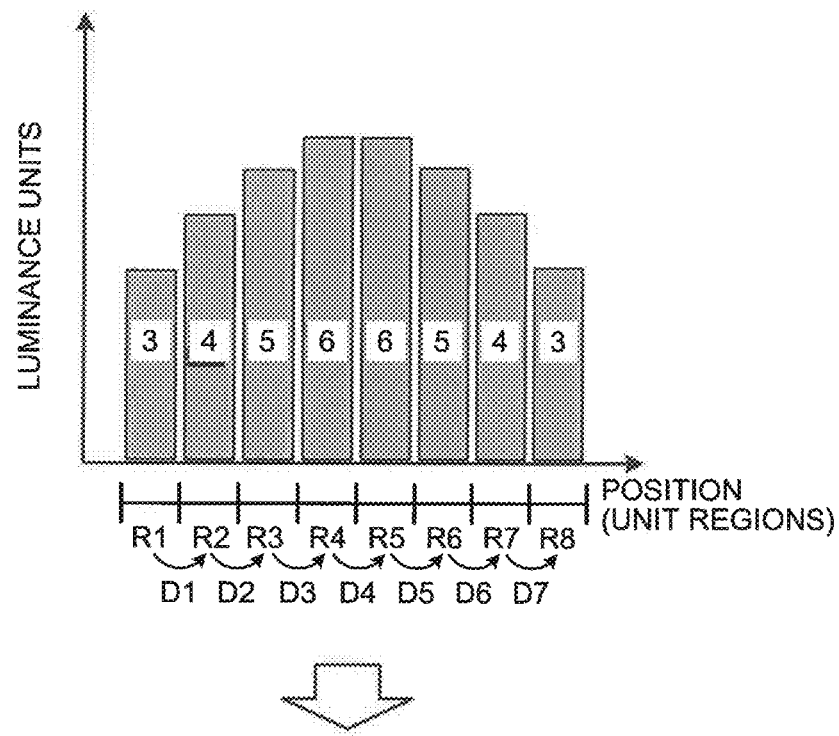
FIG. 8 is a schematic illustrating the details of the process performed by the second detecting unit.
Figure 9:
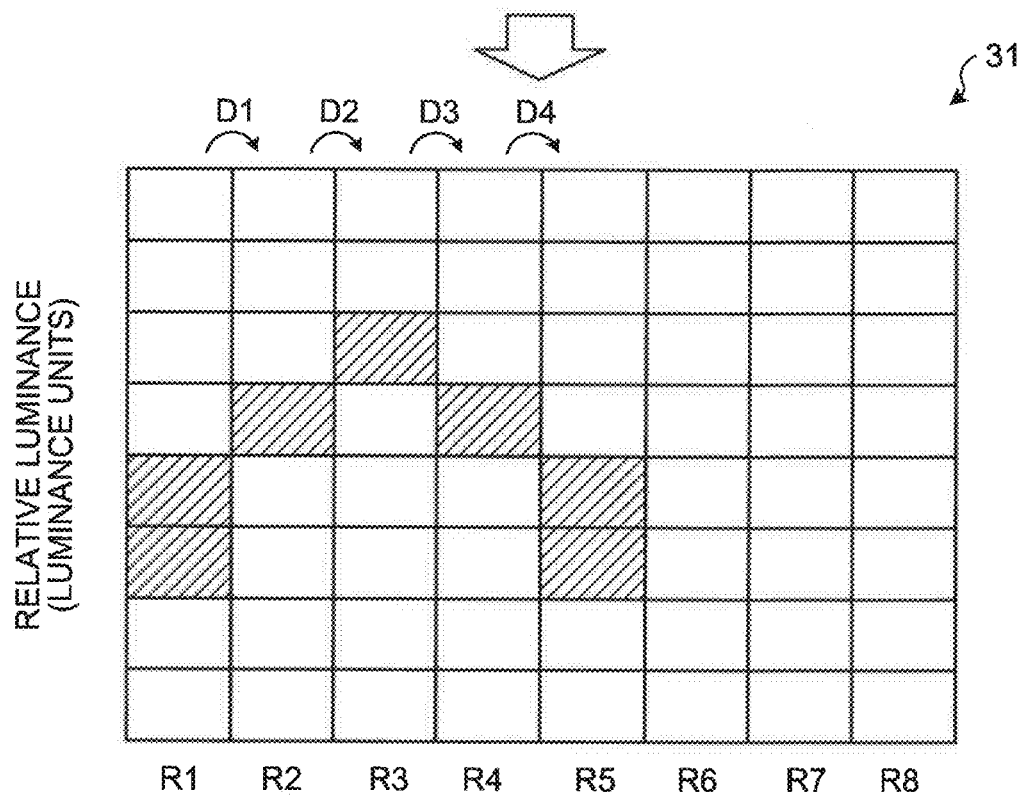
FIG. 9 is a schematic illustrating the details of the process performed by the second detecting unit.

FIGS. 8 and 9 are schematics illustrating the details of the process performed by the second detecting unit 24. The top graph in FIG. 8 represents a luminance distribution in the candidate region 200, and the representative values corresponding to the respective unit regions R1 to R8 are indicated on the white background inside of the respective bars.

To begin with, as illustrated in the upper part of FIG. 8, the second detecting unit 24 calculates amounts of change D1 to D7 between the adjacent unit regions R1 to R8 in the luminance units. A table containing the amounts of change D1 to D7 is indicated in the lower part of FIG. 8 (upper table).

If the pattern of change followed by the irregularity in the luminance distribution satisfies a predetermined pattern of change, the second detecting unit 24 determines that the candidate region 200 is a second region A2. Specifically, the second detecting unit 24 performs this determination process by comparing each of the amounts of change D1 to D7 with the irregularity condition information 31 stored in the storage unit 3.

As an example of the irregularity condition information 31, an example of a table containing threshold ranges for the respective amounts of change D1 to D7 is indicated in the lower part of FIG. 8 (lower table). If each of the amounts of change D1 to D7 in the candidate region 200 falls within the corresponding threshold range specified for the amount of change D1 to D7 in the irregularity condition information 31, the second detecting unit 24 determines that the candidate region 200 is a second region A2.

In other words, if the amounts of change D1 to D7 between the adjacent unit regions R1 to R8 in the luminance units satisfy the pattern of change specified as the threshold ranges in the irregularity condition information 31, the second detecting unit 24 determines that the candidate region 200 is the second region A2.

In other words, before the second detecting unit 24 performs the determination process, the feature of blurred regions, the feature being such the luminance gradually becomes higher (or lower) toward the center of the candidate region 200, is stored as a threshold range in the irregularity condition information 31. In this manner, the second detecting unit 24 can detect a blurred region caused by the adhesion of water, as a second region A2.

Furthermore, with the use of the amounts of change D1 to D7, the second detecting unit 24 can ignore the difference in the scales of the luminance values. Therefore, it is possible to reduce the number of erroneous determinations made when the shapes of the irregularities are similar, but the luminance values are different in scales. Furthermore, because the scales of the luminance values can be ignored, it is not necessary to establish a determination condition for each of the luminance values. Therefore, the storage capacity for storing the conditions can be reduced. Furthermore, because it is not necessary to make the determination for each of the luminance values, the processing burden can be reduced.

Furthermore, by specifying the amounts of change D1 to D7 with some widths by setting the maximum and the minimum thereto in the irregularity condition information 31, even if the adhering substance has a distorted shape, such a region can be detected as an adhering substance region. In other words, even when the adhering substance has different shapes, such regions can be detected as adhering substance regions highly accurately.

Illustrated in FIG. 8 is an example in which the threshold range is set to each of the amounts of change D1 to D7 in the irregularity condition information 31. However, when detected are small-sized second regions A2, it is possible to set the threshold range only for some of the amounts of change D1 to D7.

Furthermore, explained in FIG. 8 is an example in which the second detecting unit 24 determines whether the amounts of change fall within the respective threshold ranges specified in the irregularity condition information 31, but the second detecting unit 24 may also perform the determination process based on the irregularity condition information 31 in which the irregularity in the luminance distribution is mapped based on the threshold ranges corresponding to the amounts of change D1 to D7, for example. This point will be now explained with reference to FIG. 9.

The table in the upper part of FIG. 9 indicates the threshold ranges corresponding to the amounts of change in the irregularity in the luminance distribution. The diagram in the lower part of FIG. 9 illustrates the irregularity condition information 31 that is mapping of the threshold ranges corresponding to the amounts of change D1 to D4 illustrated in the upper part of FIG. 9. Specifically, the diagram in the lower part of FIG. 9 provides a map in which the horizontal axis represents the positions of the unit regions R1 to R8, and the vertical axis represents the relative luminance. Such a map is generated in advance.

For example, the amount of change Di is specified as a threshold range of +1 to +2, so two squares at predetermined positions in the relative luminance are set as the threshold for the unit region R1. For the unit region R2, one square at a position satisfying the threshold range of the amount of change D1 is set as the threshold. The amount of change D2 is specified with a value +1, so a square at the level immediately above the square set for the unit region R2 is set as the threshold for the unit region R3. The amount of change D3 has a value of −1, so the square at the level immediately below the square set for the unit region R3 is set as the threshold for the unit region R4. The amount of change D4 is specified with a threshold range from −2 to −1, so the two squares at the level immediately below the square set for the unit region R4 are set as the threshold for the unit region R5. By following these steps, the mapping of the irregularity condition information 31 is completed.

In other words, the map specified in the irregularity condition information 31 is information representing the shape of the irregularity in the luminance units in the unit regions R1 to R5, mapped based on the amounts of change D1 to D4. Because no threshold range is set for the amounts of change D5 to D7, any luminance to be detected is acceptable for the unit regions R6 to R8.

The second detecting unit 24 creates a map, based on the amounts of change D1 to D7 in the unit regions R1 to R8 included in the extracted candidate region 200, following the same steps as those described above, performs a matching process of matching the map with the map of the irregularity condition information 31, and determines that the candidate region 200 is a second region A2 if the maps match.

In the example illustrated in FIG. 9, if the map based on the candidate region 200 has an inverted V-shape as that of the map of the irregularity condition information 31, the second detecting unit 24 determines that the candidate region 200 is a second region A2 that is a blurred region in which the luminance becomes lower from the center toward the periphery. By contrast, if the map based on the candidate region 200 has a V-shape as that of the map of the irregularity condition information 31, the second detecting unit 24 determines that the candidate region 200 is a second region A2 that is a blurred region in which the luminance becomes higher from the center toward the periphery.

In other words, if the irregularity in the luminance distribution in the candidate region 200 has an inverted V-shape or a V shape, the second detecting unit 24 determines that the candidate region 200 is a second region A2. In this manner, because the determination process can be performed depending only on the shape of the irregularity, with the factor of the luminance values (luminance units) removed, missed detection due to the scales of the luminance values can be reduced. Therefore, an adhering substance can be detected highly accurately.

If the second detecting unit 24 keeps determining that the candidate region 200 is a second region A2 continuously, based on the captured images I captured in the temporal order, the second detecting unit 24 may determine that candidate region 200 is a region ascertained as a second region A2.

Specifically, every time the second detecting unit 24 performs a determination process as to whether a candidate region 200 is a second region A2, the second detecting unit 24 assigns a score corresponding to the determination result to the candidate region 200, for each of a plurality of candidate regions 200, and determines the candidate region 200 having a total score satisfying a predetermined threshold condition as a region ascertained as a second region A2.

More specifically, if the second detecting unit 24 determines that a candidate region 200 is a second region A2, the second detecting unit 24 adds a predetermined value to the total score. If the second detecting unit 24 determines that the candidate region 200 is not a second region A2, the second detecting unit 24 subtracts a predetermined value from the total score. The same predetermined value may be used for both of the addition and the subtraction, or different predetermined values may be used for the addition and the subtraction.

The second detecting unit 24 then performs a conversion process of converting the detected second region A2 into a region having a size corresponding to the segments 100. This point will now be explained with reference to FIG. 10.

Figure 10:
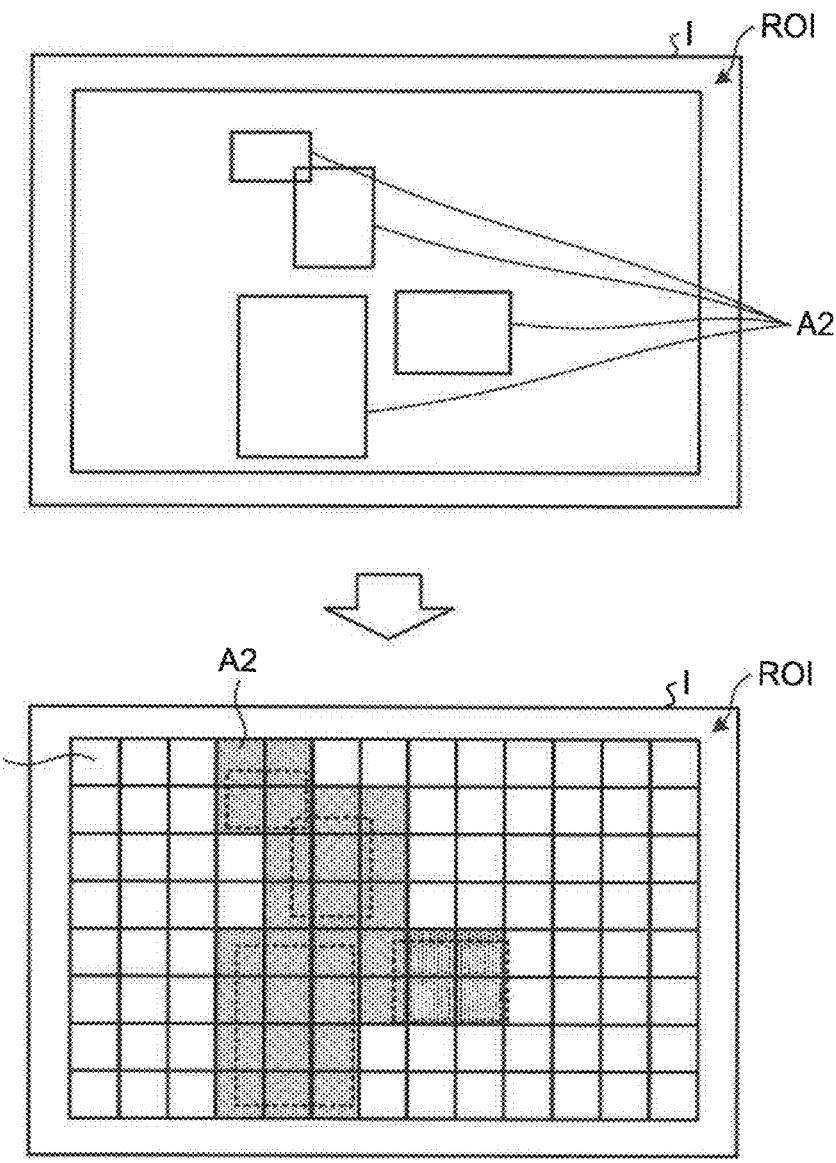
FIG. 10 is a schematic illustrating a second region conversion process performed by the second detecting unit.

FIG. 10 is a schematic illustrating the conversion process of the second region A2, performed by the second detecting unit 24. The upper part of FIG. 10 illustrates the second regions A2 detected from the region of interest ROI included in the captured image I. The lower part of FIG. 10 illustrates the segments 100 set to the region of interest ROI. The number and the layout of the segments 100 into which the second region A2 is to be converted by the second detecting unit 24 are matched with those of the segments 100 set by the first detecting unit 23 (see FIG. 3).

As illustrated in FIG. 10, the second detecting unit 24 superimposes the detected second region A2 (hereinafter, sometimes referred to as an original second region A2) over the segments 100, and generates segments 100 overlapping with the original second region A2 as a converted second region A2 (sometimes referred to as a new second region A2). In the generation of a new second region A2, it is preferable to consider not only the condition that the segments 100 corresponding thereto are blurred regions, but also the condition that there has been no variation in the feature value in the segments 100. More specifically, it is preferable to generate a segment 100 that satisfies the condition (1) mentioned above, among the conditions (1) to (3) used in the calculations of the regions A1, and that overlaps with the original second region A2, as a new second region A2. The condition (1) mentioned above stipulates that the luminance at the segment 100 has gone through little variation. In this manner, an adhering substance, such as a mixture of a water drop and mud, can be detected effectively, even if such a region is blurred, has gone through little luminance variation, but is not represented as a black spot without any gradation.

Specifically, if a segment 100 is occupied by the original second region A2 by a ratio equal to or higher than a predetermined threshold, the second detecting unit 24 generates the segment 100 as a new second region A2. In other words, the second detecting unit 24 detects the second region A2 correspondingly to the segments 100.

Referring back to FIG. 2, the generating unit 25 will now be explained. The generating unit 25 generates a sum region that is the sum of the first regions A1 detected by the first detecting unit 23, and the second regions A2 detected by the second detecting unit 24, as an adhering substance region A12. The details of this process performed by the generating unit 25 will now be explained with reference to FIG. 11.

Figure 11:
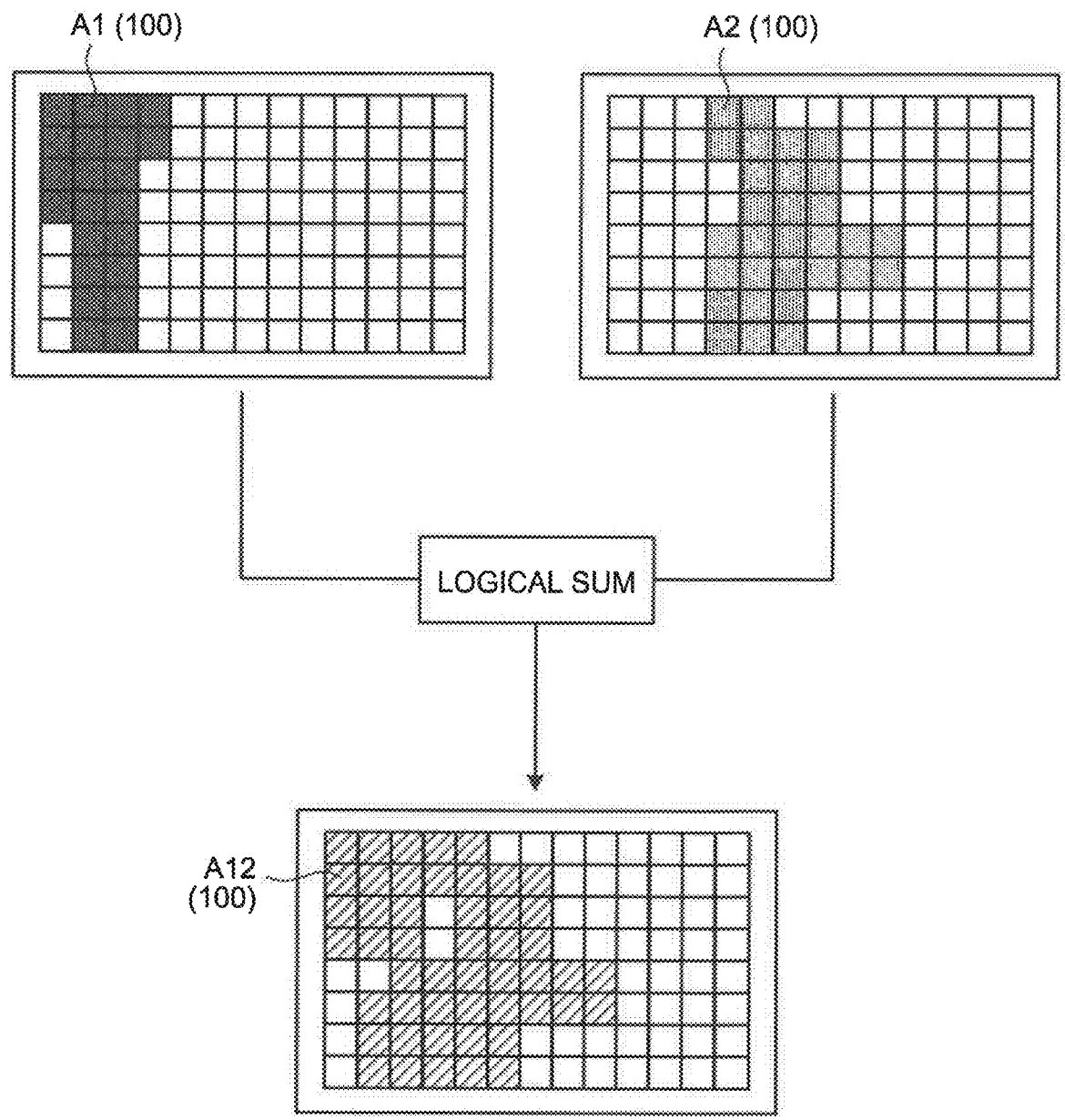
FIG. 11 is a schematic illustrating the details of a process performed by a generating unit.

FIG. 11 is a schematic illustrating the details of the process performed by the generating unit 25. As illustrated in FIG. 11, the generating unit 25 generates a region that is a logical sum of the first region A1 corresponding to the segments 100 and the second region A2 corresponding to the segments 100, as the adhering substance region A12. In other words, the generating unit 25 generates an adhering substance region A12 correspondingly to the segments 100. Without simply taking a logical sum, the condition (1) may be taken into consideration, as mentioned earlier, at this point in time. Specifically, the generating unit 25 may generate a new second region A2 merely by taking over the original second regions A2 as they are, and exclude the segments 100 not satisfying the condition (1) in acquiring the sum for the new second region A2.

In this manner, by using the adhering substance region A12, the first region A1, and the second region A2 all of which correspond to the segments 100, the adhering substance region A12 can be generated using the unified information. Therefore, complication of the process can be avoided. Furthermore, by setting a plurality of pixels as a segment 100, the units in which the processes are performed are changed from the pixels to the segments 100. In this manner, the number of times the process is performed can be reduced, so that the processing load can be reduced.

The generating unit 25 then calculates an occupied ratio that is a ratio of the region of interest ROI occupied by the adhering substance region A12. If the occupied ratio is equal to or higher than a predetermined threshold (e.g., 40%), the generating unit 25 generates an adhering substance flag ON, and outputs the signal to the flag output unit 27.

If the occupied ratio is equal to or higher than the predetermined threshold (e.g., 40%), the generating unit 25 also calculates the feature value related to the luminance in the adhering substance region A12, and outputs the feature value to the removal determining unit 26

Referring back to FIG. 2, the removal determining unit 26 will now be explained. The removal determining unit 26 determines whether the adhering substance has been removed, based on the variation in the feature value related to the luminance in the adhering substance region A12 generated by the generating unit 25. The details of this process performed by the removal determining unit 26 will now be explained specifically, with reference to FIGS. 12 and 13.

Figure 12:
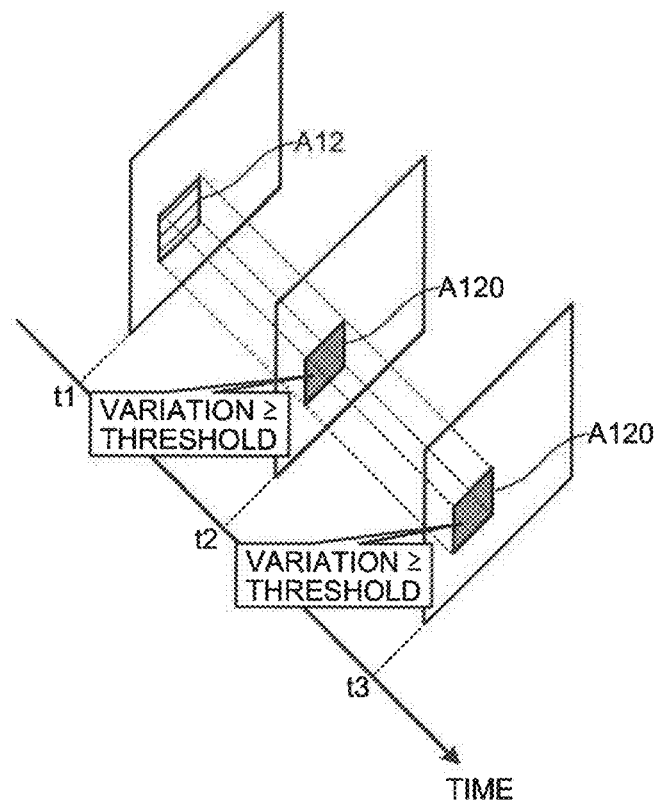
FIG. 12 is a schematic illustrating the details of a process performed by a removal determining unit.
Figure 13:
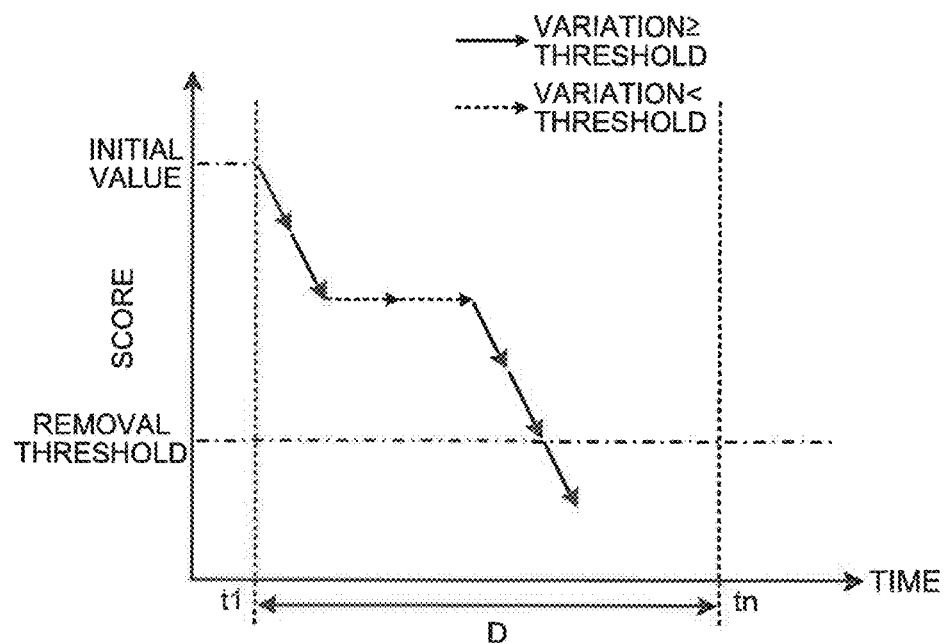
FIG. 13 is a schematic illustrating the details of the process performed by the removal determining unit.

FIGS. 12 and 13 are schematics illustrating the details of the process performed by the removal determining unit 26. In FIG. 12, it is assumed that the occupied ratio occupied by the adhering substance region A12 has reached a level equal to or higher than the predetermined threshold at time t1.

The removal determining unit 26 calculates a variation between a feature value at the time at which the adhering substance region A12 is generated, and a feature value that is based on the current captured image I, and determines that the adhering substance has been removed when the variation continues to remain at a level equal to or higher than the predetermined threshold.

Specifically, every time a new captured image I is received, the removal determining unit 26 calculates the feature value related to the luminance of a determination region A120 included in the new captured image I, and calculates a difference between the feature value in the determination region A120 and that in the adhering substance region A12. In the example illustrated in FIG. 12, the removal determining unit 26 calculates the difference between the feature value in the adhering substance region A12 at the time t1, and the feature value in the determination region A120 at time t2, as the variation, and calculates the difference between the feature value in the adhering substance region A12 at the time t1, and the feature value in the determination region A120 at time t3, as the variation.

In other words, the removal determining unit 26 determines that the adhering substance has been removed only based on the variation in the feature value in the adhering substance region A12 (the determination region A120), not through the detection processes performed by the first detecting unit 23 and the second detecting unit 24.

In this manner, because the accuracy of the removal determination does not depend on the detection results of both of the first detecting unit 23 and the second detecting unit 24, determination errors in the removal determinations can be reduced.

The removal determining unit 26 may determine that the adhering substance has been removed if the number of times the condition "variation≥threshold" is satisfied has become equal to or more than a predetermined number of times, or may calculate a score for each determination result "variation≥threshold", and determine whether the adhering substance has been removed based on the score. This point will now be explained, with reference to FIG. 13.

In FIG. 13, the vertical axis represents the score indicating the continuity related to the removal determinations, and the horizontal axis represents time. It is assumed herein that the time t1 is the time at which the occupied ratio occupied by the adhering substance region A12 has become equal to or higher than the predetermined threshold. The arrow in the solid line indicates a determination result of "variation≥threshold", and the arrow in the dotted line indicates a determination result of "variation<threshold".

As illustrated in FIG. 13, the removal determining unit 26 assigns an initial value to the score of the adhering substance region A12 at the time t1, subtracts the score when it is determined that "variation≥threshold", and maintains the score when it is determined that "variation<threshold".

If the score drops to a level lower than a predetermined removal threshold within a predetermined time period D between the time t1 and time tn, the removal determining unit 26 determines that the adhering substance corresponding to the adhering substance region A12 has been removed. The predetermined time period D is a time period that is set in advance, and is a time period allowing a determination to be made as to whether a removing operation has been performed. In this manner, if the condition "variation≥threshold" remains being satisfied over the predetermined time period D, it can be determined that the adhering substance has been removed. Therefore, it is possible to avoid making an erroneous determination when "variation≥threshold" is satisfied temporarily due to the noise in the captured image I, for example. In other words, the removal determination can be performed highly accurately.

When the predetermined time period D expires while the score is at a level equal to or higher than the removal threshold, the removal determining unit 26 sets the score to the initial value again.

When it is determined that the adhering substance corresponding to the adhering substance region A12 has been removed, the removal determining unit 26 generate an adhering substance flag OFF, and outputs the signal to the flag output unit 27.

Referring back to FIG. 2, the flag output unit 27 will now be explained. Upon receiving an adhering substance flag ON from the generating unit 25, the flag output unit 27 outputs the adhering substance flag ON indicating that the adhering substance adheres to, to the various devices 50. Upon receiving an adhering substance flag OFF from the removal determining unit 26, the flag output unit 27 outputs the adhering substance flag OFF indicating that no adhering substance adheres to, to the various devices 50.

in other words, the information indicating whether the adhering substance flag is ON or OFF serves as information indicating validity of whether the various devices 50 can use the captured image I corresponding to the current frame, or as information indicating the reliability of control performed by the various devices 50 using the captured image I. Therefore, instead of the information of the adhering substance flag, the second detecting unit 24 may also output information indicating the validity or the reliability of the captured image I to the various devices 50.

Figure 14:
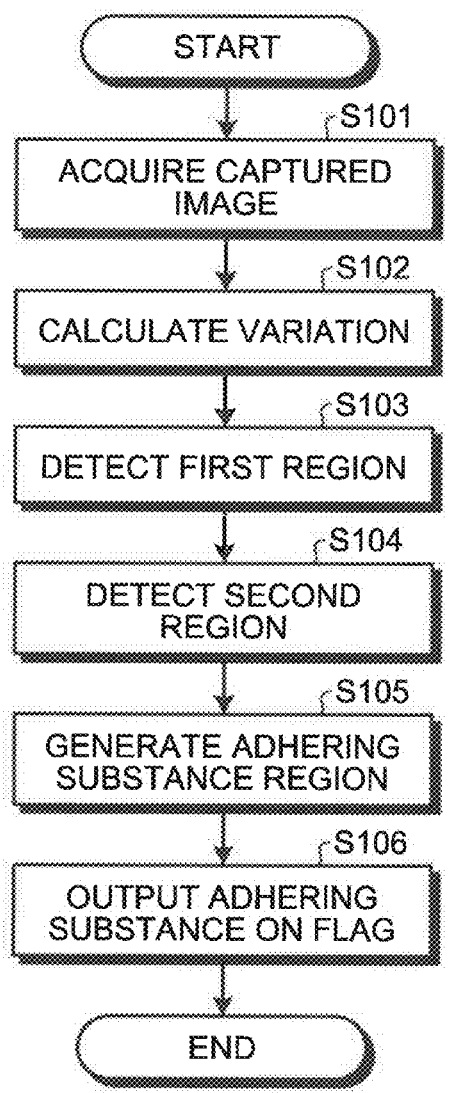
FIG. 14 is a flowchart illustrating the sequence of an adhesion detecting process performed by the adhering substance detection apparatus according to the embodiment.

The sequence of the adhesion detecting process performed by the adhering substance detection apparatus 1 according to the embodiment will now be explained with reference to FIG. 14. FIG. 14 is a flowchart illustrating the sequence of the adhesion detecting process performed by the adhering substance detection apparatus 1 according to the embodiment.

As illustrated in FIG. 14, to begin with, the acquiring unit 21 acquires an image captured by the camera 10, applies a gray-scaling process and a decimation process to the acquired image, and acquires an integral image generated based on the pixel values of the decimated image, as a captured image I (S101).

The calculating unit 22 calculates a variation in the feature value related to the luminance of the current and the past captured images I, based on the luminance of the pixels included in the captured images I (S102).

The first detecting unit 23 then detects a first region A1 in which the variation calculated by the calculating unit 22 falls within a predetermined threshold range, and in which the feature value in the current captured image I falls within a predetermined threshold range (S103).

The second detecting unit 24 then detects a second region A2 in which the irregularity in the pixel luminance distribution in the captured image I satisfies a predetermined irregularity condition (S104). The generating unit 25 then generates a sum region that is the sum of the first region A1 detected by the first detecting unit 23 and the second region A2 detected by the second detecting unit 24, as an adhering substance region A12 (S105).

The flag output unit 27 then outputs the adhering substance flag ON input from the generating unit 25 to the various devices 50 (S106), and the process is ended.

Figure 15:
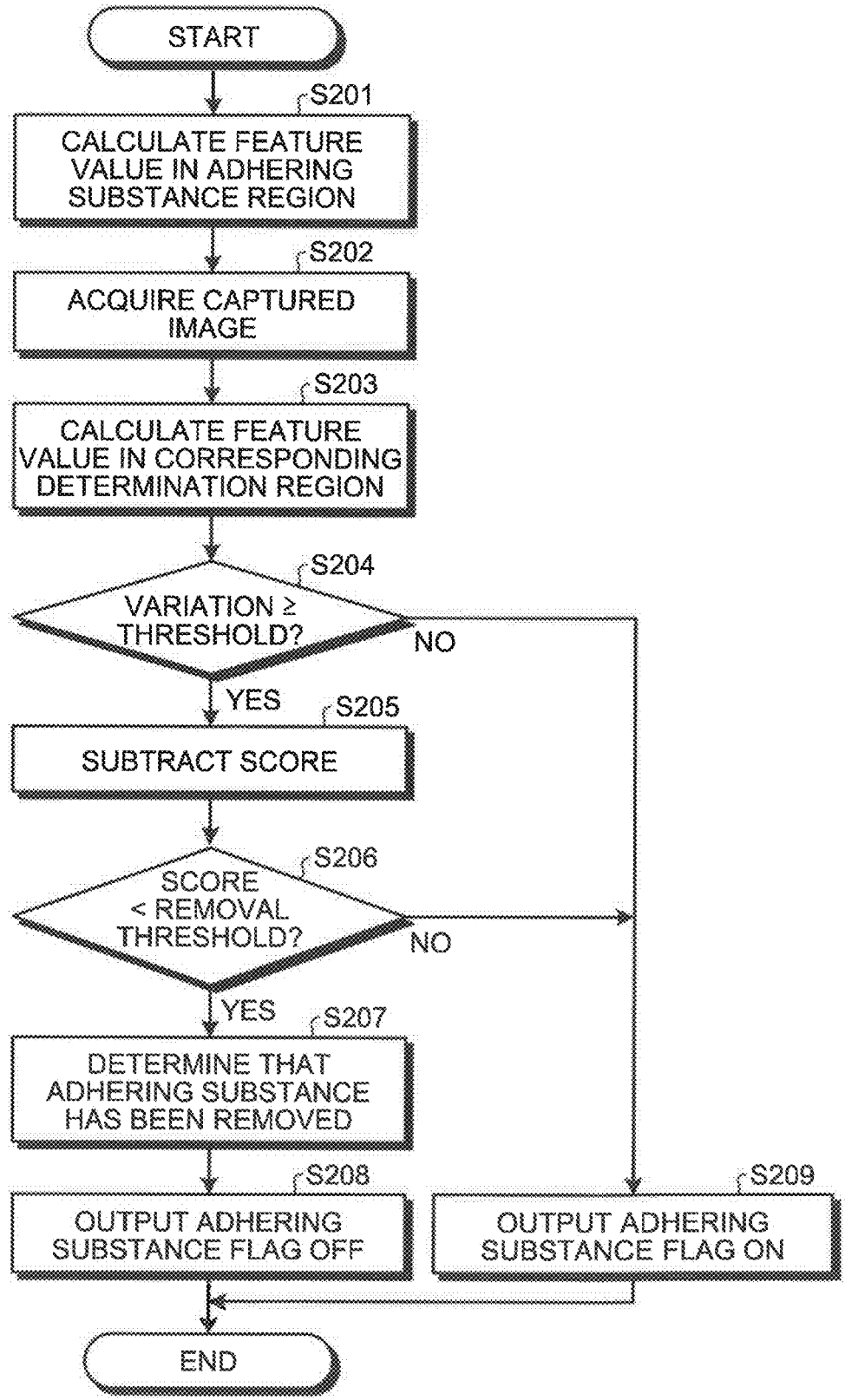
FIG. 15 is a flowchart illustrating the sequence of a removal determination process performed by the adhering substance detection apparatus according to the embodiment.

The sequence of the removal determination process performed by the adhering substance detection apparatus 1 according to the embodiment will now be explained with reference to FIG. 15. FIG. 15 is a flowchart illustrating the sequence of the removal determination process performed by the adhering substance detection apparatus 1 according to the embodiment.

As illustrated in FIG. 15, the generating unit 25 calculates the feature value of the adhering substance region A12 (S201). The acquiring unit 21 then acquires the captured image I (S202).

The removal determining unit 26 calculates the feature value in the determination region A120, which corresponds to the adhering substance region A12 (S203). The removal determining unit 26 determines whether the variation that is the difference between the feature value of the adhering substance region A12 and the feature value of the determination region A120 is equal to or higher than a predetermined threshold (S204).

If the variation is equal to or greater than a predetermined threshold (Yes at S204), the removal determining unit 26 subtracts a predetermined value from the initial score (S205). The removal determining unit 26 then determines whether the score is less than the removal threshold (S206).

If the score is less than the removal threshold (Yes at S206), the removal determining unit 26 determines that the adhering substance corresponding to the adhering substance region A12 has been removed (S207). The flag output unit 27 then outputs the adhering substance flag OFF input from the removal determining unit 26 to the various devices 50 (S208), and the process is ended.

If the removal determining unit 26 determines that the variation less than the predetermined threshold at Step S204 (No at S204), the flag output unit 27 outputs the adhering substance flag ON (S209), and the process is ended.

If the score is equal to or higher than the removal threshold at Step S206 (No at S206), the removal determining unit 26 performs Step S209, and the process is ended.

As described above, the adhering substance detection apparatus 1 according to the embodiment includes the calculating unit 22, the first detecting unit 23, the second detecting unit 24, and the generating unit 25. The calculating unit 22 calculates a variation in the feature value related to the luminance in the past and current captured images I captured by the camera 10, based on the luminance of the pixels included in the captured images I. The first detecting unit 23 detects a first region A1 in which the variation calculated by the calculating unit 22 falls within a predetermined threshold range and in which the feature value in the current captured image I falls within a predetermined threshold range. The second detecting unit 24 detects a second region A2 in which the irregularity in the luminance distribution of the pixels included in the captured image I satisfies a predetermined irregularity condition. The generating unit 25 generates a sum region that is the sum of the first region A1 detected by the first detecting unit 23 and the second region A2 detected by the second detecting unit 24, as an adhering substance region A12 corresponding to the adhering substance adhering to the camera 10. In this manner, adhering substance can be detected highly accurately.

Furthermore, explained in the embodiment above is an example in which the captured images I captured with a camera provided on board a vehicle is used, but the captured images I may be those captured by a surveillance camera or a camera installed on a street light, for example. In other words, the captured images I may be any captured images I that are captured with a camera on which some adhering substance can adhere to the lens of the camera.

According to the present invention, an adhering substance can be detected highly accurately.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An adhering substance detection apparatus comprising:
a calculating unit that calculates a variation in a feature value related to luminance in past and current captured images captured by an image capturing device, based on the luminance of pixels included in the captured images;
a first detecting unit that detects a first region in which the variation calculated by the calculating unit falls within a predetermined threshold range, and in which the feature value in the current captured image falls within a predetermined threshold range;
a second detecting unit that detects a second region in which an irregularity in a distribution of the luminance of the pixels included in the captured image satisfies a predetermined irregularity condition; and
a generating unit that generates a sum region. that is a sum of the first region detected by the first detecting unit, and the second region detected by the second detecting unit, as an adhering substance region corresponding to an adhering substance adhering to the image capturing device.

2. The adhering substance detection apparatus according to claim 1, wherein
the calculating unit calculates the variation for each of a plurality of segments that are set to the captured image,
the first detecting unit detects the first region corresponding to the segments,
the second detecting unit detects the second region corresponding to the segments, and the generating unit generates the adhering substance region corresponding to the segments.

3. The adhering substance detection apparatus according to claim 1, further comprising a removal determining unit that determines whether the adhering substance has been removed, based on the variation in the feature value related to the luminance in the adhering substance region generated by the generating unit.

4. The adhering substance detection apparatus according to claim 3, wherein the removal determining unit calculates a variation between the feature value of time at which the adhering substance region is generated and the feature value that is based on the current captured image, and determines that the adhering substance has been removed when the variation remains equal to or greater than a predetermined threshold, continuously.

5. The adhering substance detection apparatus according to claim 1, wherein
the calculating unit
calculates a representative value of the luminance and a dispersion of the luminance in a predetermined region as the feature value, and
calculate a first difference between a past representative value and a current representative value of the luminance, and a second difference between a current dispersion and a past dispersion of the luminance, as the variation, and
the first detecting unit detects the first region in which the first difference is equal to or less than a first predetermined difference, in which the second difference is equal to or less than a second predetermined difference, and in which the current representative value of the luminance is equal to or less than a first predetermined value.

6. The adhering substance detection apparatus according to claim 1, wherein the second detecting unit detects the second region in which a pattern of change in the irregularity in the distribution of the luminance satisfies a predetermined pattern of change.

7. An adhering substance detection method comprising:
calculating a variation in a feature value related to luminance in past and current captured images captured by an image capturing device, based on the luminance of pixels included in the captured images;
detecting a first region in which the variation calculated at the calculating falls within a predetermined threshold range, and in which the feature value in the current captured image falls within a predetermined threshold range;
detecting a second region in which an irregularity in a distribution of the luminance of the pixels included in the captured image satisfies a predetermined irregularity condition;
generating a sum region that a sum of the first region detected at the detecting of the first region, and the second region detected at the detecting of the second region, as an adhering substance region corresponding to an adhering substance adhering to the image capturing device.

* * * * *